United States Patent
van der Kooij

[19]

[11] Patent Number: 5,835,055
[45] Date of Patent: Nov. 10, 1998

[54] METHOD FOR ITERATIVE DISK MASKING AND AUTOMATIC ERROR REPAIR FOR PHASE UNWRAPPING

[75] Inventor: Marco Willem Antonie van der Kooij, Ottawa, Canada

[73] Assignee: Atlantis Scientific Inc., Ottawa, Canada

[21] Appl. No.: 618,914

[22] Filed: Mar. 20, 1996

[51] Int. Cl.$^6$ ..................................................... G01S 13/90
[52] U.S. Cl. ........................... 342/25; 342/162; 342/195
[58] Field of Search ........................... 342/25, 162, 194, 342/195, 197

[56] References Cited

U.S. PATENT DOCUMENTS

| | | | |
|---|---|---|---|
| 4,975,704 | 12/1990 | Gabriel et al. | 342/25 |
| 5,260,708 | 11/1993 | Auterman | 342/25 |
| 5,321,497 | 6/1994 | Ai et al. | 356/359 |
| 5,424,743 | 6/1995 | Ghiglia et al. | 342/25 |
| 5,489,907 | 2/1996 | Zink et al. | 342/25 |
| 5,572,220 | 11/1996 | Cai | 342/442 |
| 5,592,181 | 1/1997 | Cai et al. | 342/457 |

OTHER PUBLICATIONS

Flynn, Thomas J., *Consistent 2-D Phase Unwrapping Guided by a Quality Map,* IEEE, pp. 2057–2059, 1996.

*Primary Examiner*—John B. Sotomayor
*Attorney, Agent, or Firm*—Welsh & Katz, Ltd.

[57] ABSTRACT

Disclosed is a new alternative method for the phase unwrapping of the interferogram of two SAR (Synthetic Aperture Radar) images of the same area. This new method uses an iterative approach to the phase unwrapping problem by applying local circular or elliptical masks centered on the phase residues. A phase unwrapping error is detected automatically during the unwrapping process by comparing each unwrapped value with neighboring unwrapped values. This new method for phase unwrapping significantly improves the quality of unwrapped phase maps. This will allow extraction of quantitative information such as height and deformation from interferometric SAR measurements. This is significant for the routine application of SAR interferometry in fields like digital elevation mapping and large scale deformation mapping.

5 Claims, 10 Drawing Sheets

METHOD FOR ITERATIVE DISK MASKING AND AUTOMATIC ERROR REPAIR FOR PHASE UNWRAPPING

The file of this patent contains at least one drawing executed in color. Copies of this patent with color drawing (s) will be provided by the Patent and Trademark Office upon request and payment of the necessary fee.

The present invention relates to terrain mapping employing Synthetic Aperture Radar (SAR) and more particularly disk masking and automatic repair of phase unwrapping.

BACKGROUND OF THE INVENTION

There exists a need for inexpensive, accurate and quickly formed terrain maps.

One method has been to use Synthetic Aperture Radar (SAR) which is operated on board of aircraft or spacecraft for mapping of the earth's surface with high resolution. Since the late 1980's, a new SAR technique, called SAR interferometry, has received much attention. In SAR interferometry, two SAR recordings of the same area are combined into a SAR interferogram. These two SAR data sets might be collected by two antennas on the same airborne or spaceborne platform. The most significant extra information in the interferogram is the phase difference between the two images. This phase difference for each pixel is directly related to the height of the local topography, and the height of that pixel can be calculated provided that we know, very accurately, the position of the recording platform(s) and the range and timing of the measurements.

Alternatively, interferometric data might be collected by a single antenna system by repeating the data collection in a second pass over the same area. This is referred to as SAR repeat-pass interferometry. The phase difference between the images is, in this case, also dependent on very small motions or deformation of the earth's surface. If the interferogram and the geometry information are combined with an input DEM (Digital Elevation Model), this deformation information can be extracted. Typical accuracies are in the cm or mm range. Applications lie in the areas of mapping and monitoring deformation caused by earthquakes, volcanic eruptions, landslides and land subsidence.

An example of an interferogram showing the phase difference between the images of two passes is given in FIG. 1. This is an image of a mountainous area in Japan collected by the JERS-1 (Japanese spaceborne SAR system). The image has dimensions of approximately 5×5 km and is filtered using an adaptive box filtering method. From this figure it becomes clear that there are two basic problems with repeat-pass interferometry:

1. The phase is ambiguous. In this case, every cycle of phase corresponds with a height difference of approximately 100 m. The phase values do not directly relate to an absolute height.
2. The phase is quite noisy (the phase coherence is low).

Therefore, in order to extract absolute height information from the interferogram of FIG. 1, the interferogram has to be "phase unwrapped." For every pixel an integer number of cycles of phase should be added is a correct way without introducing phase unwrapping errors.

Because of the low phase coherence and the occurrence of radar specific distortions in the image (e.g. layover of mountains), phase unwrapping is considered to be one of the most challenging problems in interferometric SAR processing and much research is devoted in the to develop robust phase unwrapping methods, particularly for repeat-pass interferometry, where the phase coherence is relatively low.

A number of methods of phase unwrapping have been proposed in literature:

1. Path dependent integration methods where areas of low power or low phase coherence are masked. This approach has been shown to work quite well for airborne interferometry (2 antennas on one platform) but does not work well for repeat-pass interferometry because of the lower phase coherence. This method is sometimes combined with phase residue connection methods (eg. Prati et al, "SAR interferometry: a 2-D phase unwrapping technique based on phase and absolute values information", Proceedings of the International Geoscience and Remote Sensing Symposium 1990, Washington, May 1990).
2. The use of phase residues connection methods. These methods are often also path dependent. A phase residue map can be directly obtained from the interferogram. A phase residue represents a potential origin of phase unwrapping errors. If a single positive or negative residue is encircled during the unwrapping process, a global error will occur and might propagate, deteriorating the quality of the unwrapped phase maps significantly. Therefore, frequently pairs or multiples of related positive or negative residues are connected by so-called artificial ghost lines to prevent the integration path from crossing. The first publication using this method was written by Goldstein et al, "Satellite radar interferometry, Two-dimensional phase unwrapping", Radio Science, Vol 23, Nr 4, Pp 713–720, 1988. Since then, many investigators have tried to optimize this technique for repeat-pass interferometry (eg. Hartyl and Wu, "SAR interferometry: experiences with various phase unwrapping methods" Proceedings of the 2nd ERS-1 Symposium ESA SP-361, Hamburg, 1993). The basic strategy of many methods like these is to minimize the total residue connection length in some way. The problem is that it is not always possible to find the related positive and negative residues that should be connected. If a wrong connection is made, serious global unwrapping errors can occur, particularly in low coherence interferograms that are obtained by using ERS-1 (European ERS-1, 35 days repeat period), Japanese ERS-1 (42 day repeat period) and RADARSAT (24 days repeat period).
3. The use of path independent phase unwrapping methods. Some methods have been proposed that attempt to solve the phase unwrapping problem in a global way, by solving the Poisson equation. These methods are very experimental and have seemingly not yet yielded practical implementations that work satisfactorily on real data

SUMMARY OF THE INVENTION

Accordingly, it is an object of the invention to provide a new and improved alternative method for the phase unwrapping of the interferogram of two SAR (Synthetic Aperture Radar) images of the same area by employing iterative disk masking and automatic error repair which produces an image which is free from global unwrapping errors and prevents the propagation of local errors.

It is another object of the invention to provide a new and improved method for phase unwrapping which significantly improves the quality of unwrapped phase maps.

It is yet another object of the invention to provide a new and improved method for phase unwrapping which allows extraction of quantitative information such as height and deformation from interferometric SAR measurement which is significant for the routine application of SAR interferometry in fields like digital elevation mapping and large scale deformation mapping.

It is a further object of this invention to provide a new and improved method for phase unwrapping whose execution is feasible, even for larger scenes.

The invention and objects and features thereof will be more fully understood from the following detailed description and appended claims when taken with the drawings.

DETAILED DESCRIPTION OF THE INVENTION

This new phase unwrapping method uses an iterative approach to the phase unwrapping problem by applying local circular or elliptical masks centered on the phase residues. A phase unwrapping error is detected automatically during the unwrapping process by comparing each unwrapped value with neighbouring unwrapped values. If the difference is larger than half a cycle of phase, it represents a phase unwrapping discontinuity (error). If a phase unwrapping error has been detected, the image is cleaned and a new mask is created with a larger local mask size. The phase unwrapping process is then restarted. If a phase unwrapping error is detected again, the image is cleaned again and the mask size is enlarged again. This process is repeated until no phase unwrapping error is detected. The image that has now been obtained is free from global unwrapping errors but still contains masked areas that have not been unwrapped. These remaining areas are unwrapped in a number of subsequent cycles, where the local mask size is reduced stepwise and the pixels that were released are unwrapped. During those subsequent cycles, the unwrapped values will not be checked for unwrapping errors. In principle, local errors might occur but they will not propagate.

The method can be schematized as follows:

start unwrapping, error detected
clean phase image, enlarge masks
restart unwrapping, error detected
clean phase image, enlarge masks
restart unwrapping, error detected
restart unwrapping, successfully finished global unwrapping without errors
replace masks with smaller masks
continue unwrapping
replace masks with smaller masks
continue unwrapping
remove remaining masks
continue unwrapping, finished unwrapping process The occurrence and severity of local phase unwrapping errors can be reduced by using an additional low coherence mask during the iterative disk masking. Every pixel that is associated with low coherence will also create local circular of elliptical disk masks centered on that pixel.

Execution of this method is even feasible for larger scenes.

Figure 1:
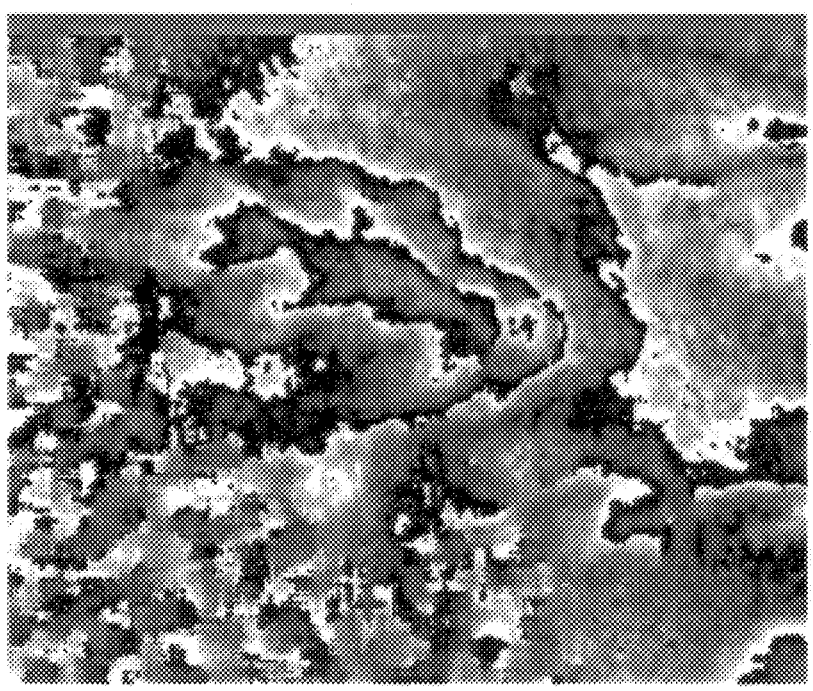
FIG. 1 illustrates an interferogram (measured phase) for a mountainous scene in Japan obtained by combining 2 SAR images of the JERS-1 (Japanese spaceborne SAR).

This phase unwrapping method is illustrated by showing intermediate results of the processing of the JERS-1 interferogram of FIG. 1. The image can be considered to be a difficult test case for unwrapping because the phase coherence is low and ranges between 0.2 and 0.5 in most of the land areas. The height in the scene varies between 0 and 500 meter.

Figure 2A:
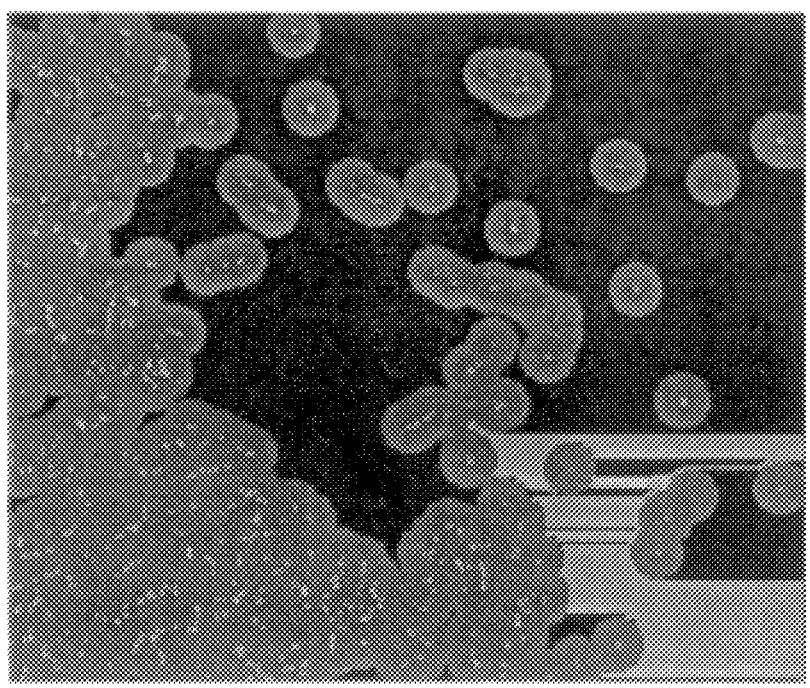
FIGS. 2(a) and 2(b) illustrate a phase unwrapping mask and unwrapped phase image after one cycle of unwrapping with a disk mask radius of 10 pixels. An unwrapping error has occurred in the lower right of the image.
Figure 2B:
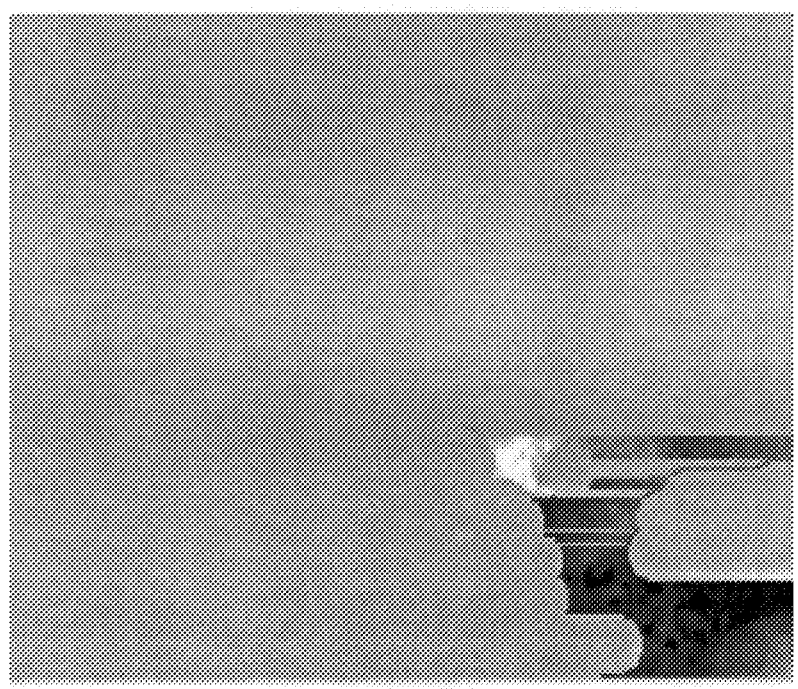

FIGS. 2a and 2b show the unwrapping mask and the unwrapped image after the first cycle of unwrapping with a circular disk mask with a radius of 10 pixels. The residues are indicated in blue (positive) and red (negative), and the disk masks are displayed as dark grey disks centered on the residues. Black indicates areas that have not been unwrapped yet, light grey indicates that the pixel has been unwrapped. In the unwrapped image it is visible that only part of the image has been unwrapped, and that an error has occurred in the lower right of the image and the unwrapping process has stopped.

Figure 3A:
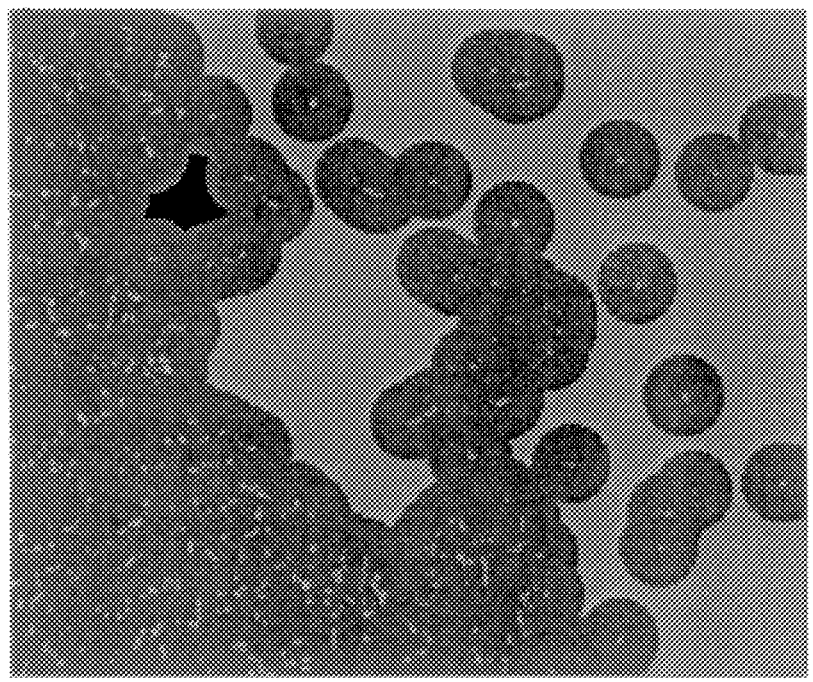
FIGS. 3(a) and 3(b) illustrate a phase unwrapping mask and unwrapped image after restarting of the phase unwrapping process with a disk radius of 15 pixels. No global unwrapping error has been detected.
Figure 3B:
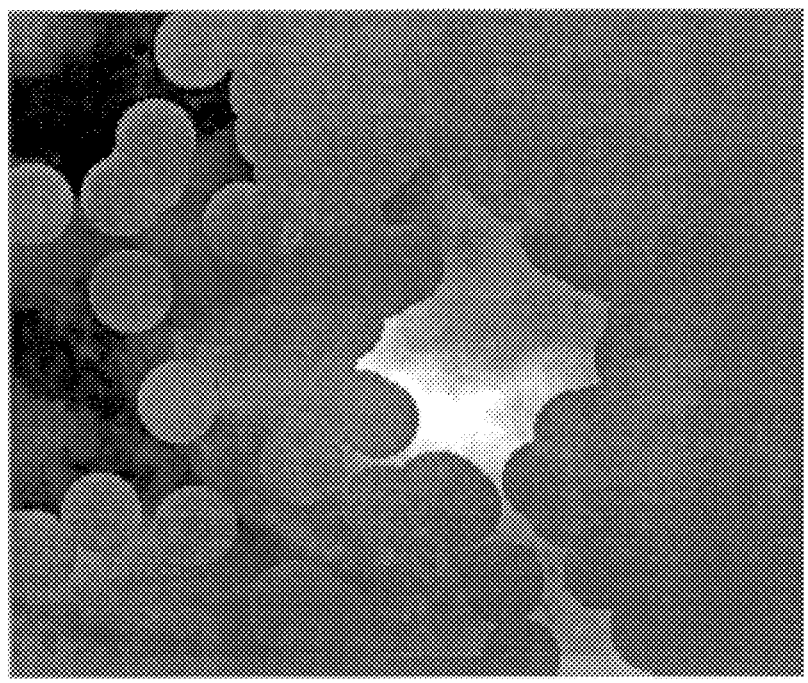

FIGS. 3a and 3b show the unwrapping mask and unwrapped image after an unwrapping cycle with a circular disk mask with a radius after 15 pixels. The image has now been unwrapped successfully without unwrapping errors.

Figure 4A:
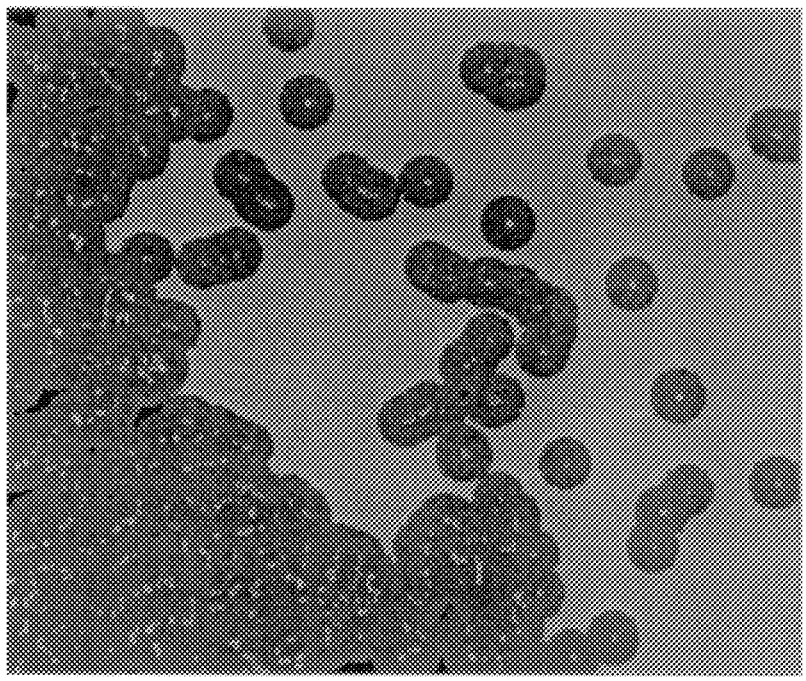
FIGS. 4(a) and 4(b) illustrates a phase unwrapping mask and unwrapped phase image after a number of subsequent reductions of the disk mask radius and corresponding unwrapping cycles. Two phase discontinuities were successfully detected. These represent "true" phase discontinuities caused by layover (radar distortion) in the image.
Figure 4B:
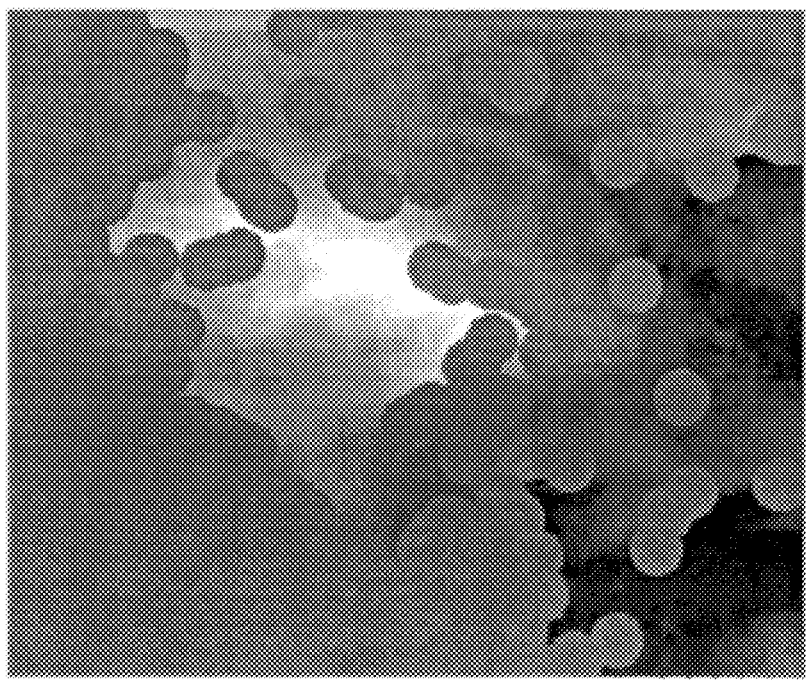

FIGS. 4a and 4b show the image after a number of subsequent reductions of the disk size (the disk radius is equal to 10 pixels) and unwrapping of the "released" pixels. As can be seen from these figures, two lines of phase discontinuities appear between isolated phase residues of opposite signs. These discontinuity lines are related to layover (radar distortions) and were correctly identified by the unwrapping process.

Figure 5A:
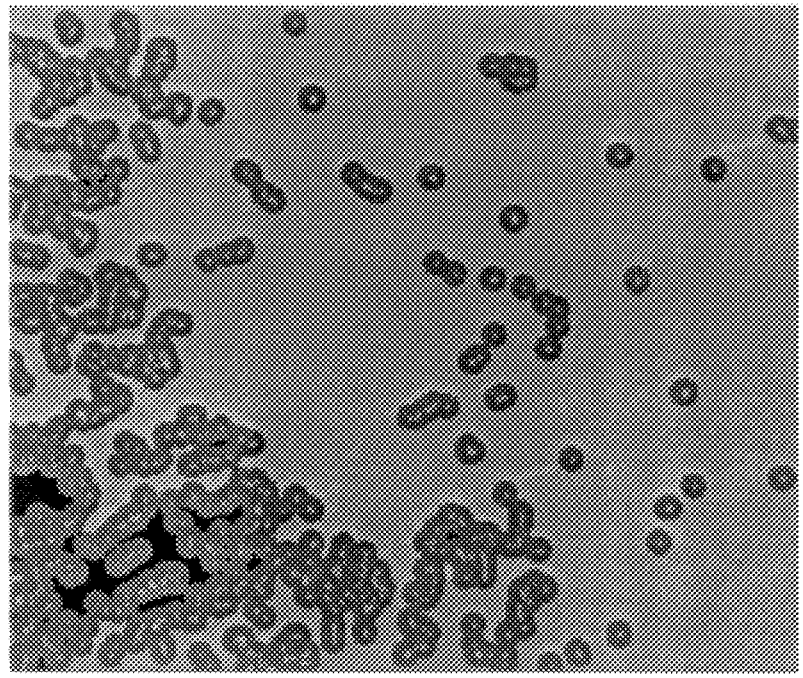
FIGS. 5(a) and 5(b) illustrate, after subsequently reducing the disk radiu to 5 pixels, the unwrapped image which is slowly "opening up" without phase unwrapping errors.
Figure 5B:
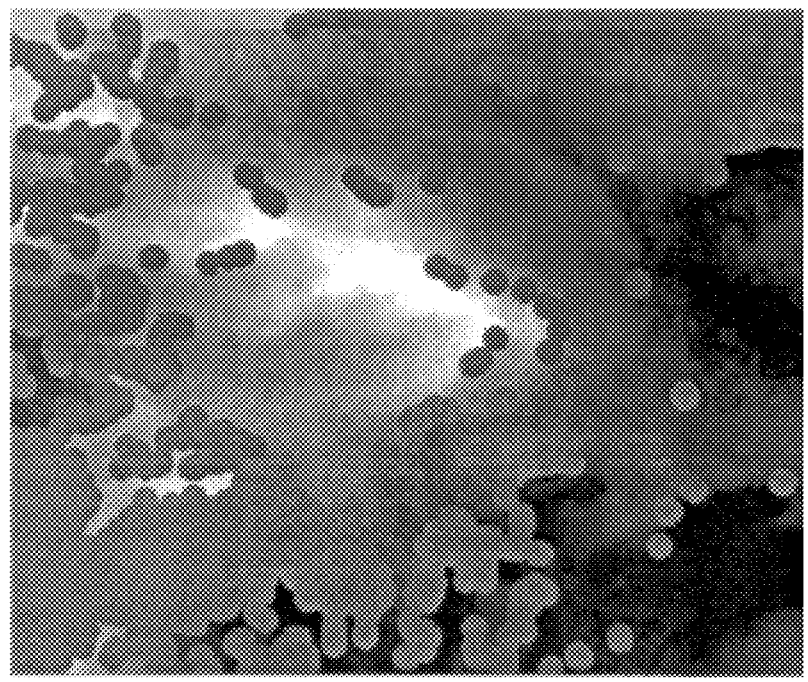

FIGS. 5a and 5b show the mask and unwrapped phase image when the disk size has been reduced to 5 pixels. No global unwrapping areas can be identified.

Figure 6:
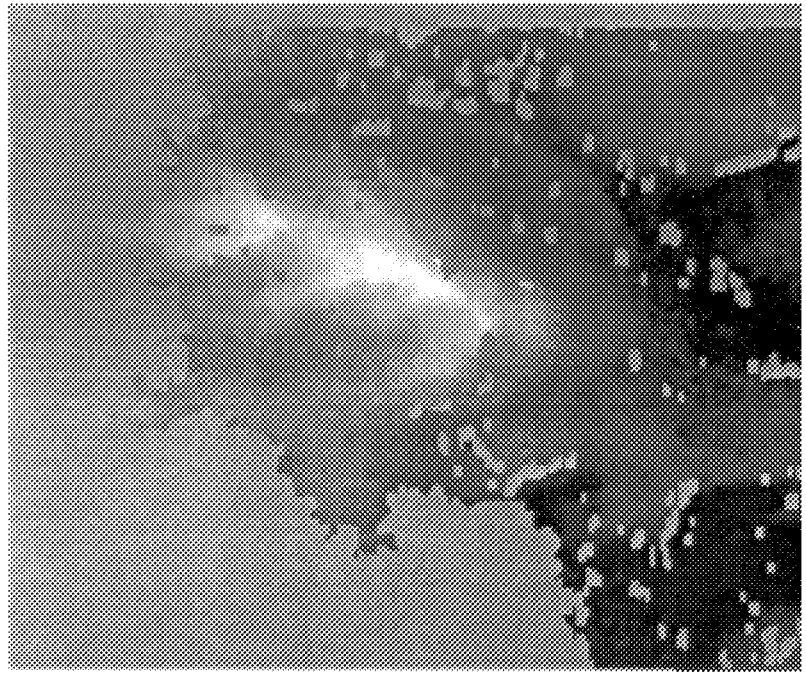
FIG. 6. illustrates a final interferogram obtained by reducing the residue disks size to zero and masking low coherent phase information.

FIG. 6 shows a final unwrapped image where the unwrapping disk mask size has been reduced to zero and coherence (noise) measurements are used to mask out ocean areas (and small local areas on the land) for presentation purposes. A satisfactory absolute phase map has been produced that can be directly converted to a DEM (digital elevation map).

In accordance with one aspect of the present invention, there is provided a method of phase unwrapping of the interferogram of two synthetic radar images of the same area comprising: a) means for applying local circular or elliptical masks centered on the phase residues; b) means for automatically detecting phase unwrapping errors during the unwrapping process; c) means for stopping and restarting the phase unwrapping process; d) means for cleaning the image at any stage in the process; and e) means for increasing and decreasing the local mask size as required.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

The embodiments of the invention in which an exclusive property or privilege is claimed are defined as follows:

1. A method of phase unwrapping of the interferogram of two synthetic radar images of the same area comprising:

means for applying local circular or elliptical masks centered on the phase residues;

means for automatically detecting phase unwrapping errors during the unwrapping process;

means for stopping and restarting the phase unwrapping process;

means for cleaning the image at any stage in the process; and means for increasing and decreasing the local mask size as required.

2. A method according to claim 1 which produces a quality image which is free from global unwrapping errors.

3. A method according to claim 1 which minimizes local unwrapping errors and which prevents the propagation of any local unwrapping errors which do occur.

4. A method according to claim 1 which allows the extraction of quantitative information such as height and deformation from interferometric synthetic aperture radar measurements.

5. A method according to claim 1 which can be incorporated into a software program.

* * * * *